United States Patent [19]

Hoizumi et al.

[11] Patent Number: 5,109,665

[45] Date of Patent: May 5, 1992

[54] WASTE HEAT RECOVERY BOILER SYSTEM

[75] Inventors: Shinichi Hoizumi; Tsugutomo Teranishi, both of Hitachi, Japan

[73] Assignee: Hitachi, Ltd., Tokyo, Japan

[21] Appl. No.: 419,962

[22] Filed: Oct. 11, 1989

[30] Foreign Application Priority Data

Oct. 14, 1988 [JP] Japan ............................... 63-257182

[51] Int. Cl.$^5$ ............................................. F01K 23/10
[52] U.S. Cl. ................................. 60/39.182; 60/676; 122/7 R
[58] Field of Search ..................... 60/39.182, 676, 679; 122/7 R, 1 R

[56] References Cited

U.S. PATENT DOCUMENTS

| | | | |
|---|---|---|---|
| 3,879,616 | 4/1975 | Baker et al. | 290/40 |
| 3,937,024 | 2/1976 | Durrant et al. | 60/676 |
| 4,578,944 | 4/1986 | Martens et al. | 60/39.182 |
| 4,891,937 | 1/1990 | Noguchi | 60/39.182 |

OTHER PUBLICATIONS

Patent Abstracts of Japan, vol. 10, No. 333 (M-534), 12 Nov. 1986, and JP-A-61 138809 (Toshiba), 26 Jun. 1986.
Patent Abstracts of Japan, vol. 10, No. 242 (M-509) (2298), 21 Aug. 1986, and JP-A-61 72808 (Toshiba), 14 Apr. 1986.

Primary Examiner—Richard A. Bertsch
Assistant Examiner—Howard R. Richman
Attorney, Agent, or Firm—Antonelli, Terry, Stout & Kraus

[57] ABSTRACT

A waste heat recovery boiler system has a plurality of waste heat recovery boilers each having a main steam generator and a reheater capable of generating main steam and reheat steam by heat derived from a hot waste gas introduced into the waste heat recovery boiler. The flows of main steam from the main steam generators are joined to form a single flow of main steam to be used in an external installation, and the flows of reheat steam from the reheaters are joined to form a single flow of reheat steam to be used in the external installation. The steam discharged from the external installation is distributed to the reheaters. Flow rate controllers are provided for controlling the flow rates of the steam through the reheaters in relation to the hot waste gas supplied to the respective waste heat recovery boilers.

5 Claims, 14 Drawing Sheets

F I G. 14
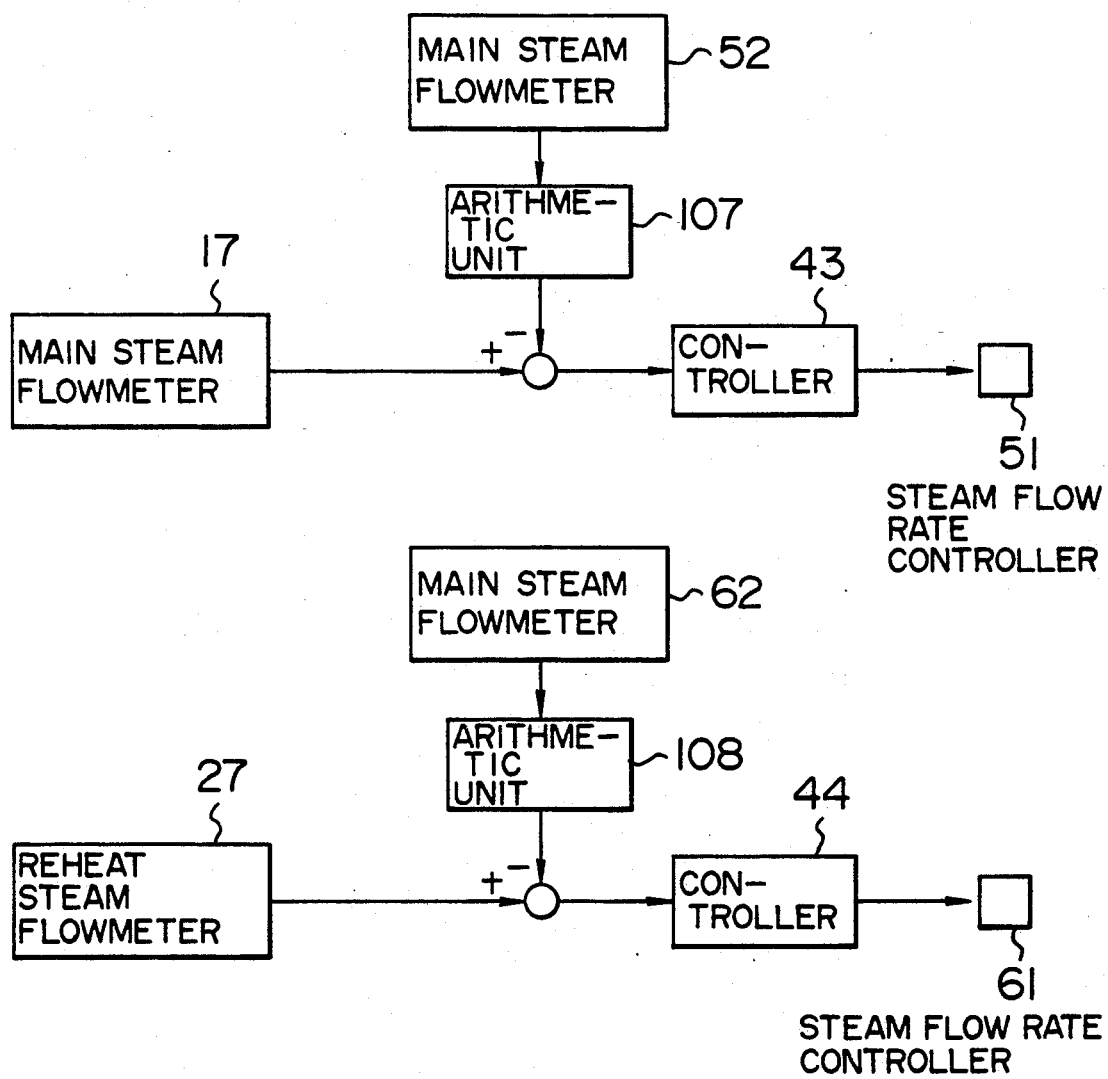

WASTE HEAT RECOVERY BOILER SYSTEM

BACKGROUND OF THE INVENTION

1. Field of the Invention

The present invention relates to a waste heat recovery boiler system having a plurality of boilers which generate steam by utilizing heat from a waste gas of a high temperature and which supply the steam to a common system which operates with steam. The invention is also concerned with a method of operating such a waste heat recovery boiler system.

2. Description of the Prior Art

Japanese Patent Unexamined Publication No. 59-68503 discloses an electrical power generating combined plant with a typical waste heat recovery boiler system with the power generating combined plant having plurality of combinations of gas turbine and waste heat recovery boilers capable of generating steam by the heat recovered from the hot exhaust gas of the gas turbines, and a steam turbine supplied with the steam commonly from the boilers. In the disclosed arrangement if only one waste heat recovery boiler is used to receive exhaust gas from a plurality of gas turbines, the operation of the system may seriously be impaired due to a reverse flow of the exhaust gas which may take place when different gas turbines are operated at different load levels. In order to avoid this problem, it is necessary to take an expensive countermeasure. On the other hand, supply of steam from a plurality of boilers to a common steam turbine offers an advantage of improved plant efficiency as a result of an increase in the size of the steam turbine.

There is a trend for higher temperature waste gas (exhaust gas from gas turbine or waste gas from a blast furnace of iron works) as the heat source of waste heat recovery boiler system. It is said that, when the temperature of the waste gas is high, a higher heat recovery efficiency can be obtained by using a combined plant of reheating type. Therefore, in current waste heat recovery systems, the waste heat recovery boiler includes a main steam generator for generating main steam and a reheater. On the other hand, steam turbine, which is the system which utilizes steam, is composed of a plurality of stages including at least a high-pressure steam turbine and a low-pressure steam turbine. The main steam is introduced into and expanded through the high-pressure turbine and the steam from the high-pressure turbine is introduced into the reheater and the steam generated by the reheater is introduced into the low-pressure or reheat steam turbine so as to drive it.

The combined plant of the reheating type is actually constructed as a multiple-type unit in which a plurality of waste heat recovery boilers and a common steam turbine are arranged such that streams of main steam from the main steam generators of the boilers and the streams of reheat steam from the reheaters of the boilers are respectively joined and then introduced to the respective stages of the steam turbine. This system therefore encounters the following technical problems to be solved.

Referring first to the reheating system, the steam from the high-pressure steam turbine is introduced in to the reheaters of the respective boilers so that reheated steam is generated in each reheater. Thus, the steam from the high-pressure steam turbine is distributed to a plurality of reheaters and the flow rates of the steam flowing into the reheaters are determined by the pressure drop or resistance across the respective reheaters. Actually, however, the reheating system is designed such that the reheaters produce the same flow resistance so that the flow rates of the steam introduced into the reheaters are substantially equalized. On the other hand, the rates of supply of the waste gases from the sources such as gas turbines to the respective waste heat recovery boilers are not always equal. For example, it is often experienced that one of the waste heat recovery boilers receives the waste gas at the rated flow rate, while another boiler receives the waste gas at a smaller rate, e.g., 50%, of the rated flow rate. Such condition tends to occur when the level of the load imposed on the whole plant is changed or when the plant is being started or stopped. Consequently, heat is supplied at different rates to different reheaters, though the reheaters are supplied with steam from the high-pressure steam turbine at an equal rate, resulting in different conditions of reheat steam generated by different reheaters. Such different steam conditions may cause a thermal stress to be generated in the portion of a reheat steam line at which flows of hot reheat steam from all reheaters join into a common pipe, causing a risk of rupturing of the reheat steam line due to the thermal stress.

When one of the heat sources, e.g., a gas turbine, and the associated waste heat recovery boiler are being started while another waste heat recovery boiler is operating, the time required for starting is prolonged due to the fact that the steam from the high-pressure steam turbine flows through the reheater of this boiler at a rate greater than the rate which corresponds to the load on the newly started gas turbine. On the other hand, the flow rate of the steam through the reheater of the operating waste heat recovery boiler is reduced to a level below that corresponding to the load on the gas turbine. Consequently, the operation of the whole plant is disturbed tremendously.

Problems are not serious in the case of the main steam system, because the water levels in the drums of the respective main steam generators are independently controllable so as to eliminate any large difference of the conditions of the main steam generated by these main steam generators. Namely, when the rate of generation of main steam in a main steam generator is increased due to an increase in the flow rate of the waste gas supplied thereto, the water level in the drum of the main steam generator is lowered and, when the water level is reduced to the lower limit level, a boiler control operates to increase the rate of supply of feedwater so as to recover the normal water level in the drum. The increased rate of supply of the feedwater naturally reduces the rate of generation of the steam. Conversely, when the rate of generation of main steam in the main steam generator is decreased as a result of reduction in the flow rate of the waste gas supplied to the main steam generator, the water level in the water drum rises and, when the upper limit level is reached, the boiler control serves to reduce the rate of supply of the feedwater so as to recover the normal water level, thus increasing the rate of generation of the main steam.

It is therefore expected that any variation in the waste gas flow rate does not cause serious difference in the conditions of the main steam generated by the main steam generators. Thus, the thermal stress and the condition of operation of the plant are not seriously affected by difference in the waste gas flow rate between different waste heat recovery boilers.

SUMMARY OF THE INVENTION

Accordingly, an object of the present invention is to provide a waste heat recovery boiler system in which differences in the steam generating rates, steam temperatures and other steam conditions between different waste heat recovery boilers, which may be caused by difference in the condition of supply of the waste gases to different waste heat recovery boilers, are reduced as much as possible so as to ensure stable operation of the plant, while eliminating problems such as the risk of rupturing steam pipes due to thermal stress.

To this end, according to the present invention, flow rate control means are provided for controlling the flow rates of the reheat steam in the reheaters of the respective waste heat recovery boilers in accordance with the conditions of supply of the waste gases to the respective waste heat recovery boilers.

According to this arrangement, the reheater of each waste heat recovery boiler can receive the steam at a rate which corresponds to the amount of heat possessed by the waste gas supplied to this boiler. In other words, it is possible to control the flow rate of the reheat steam such that all the reheaters operate at a substantially equal ratio between the heat possessed by the reheat steam and the heat possessed by the waste gas, so that the conditions of the steam generated by all the reheaters are substantially equalized.

Thus, the flow rates of the steam through the reheaters of the waste heat recovery boilers are controlled in accordance with the conditions of the heat sources associated with the boilers, so that the plant can operate stably and safely.

The above and other objects, features and advantages of the present invention will become clear from the following description of the preferred embodiments when the same is read in conjunction with the accompanying drawings.

BRIEF DESCRIPTION OF THE DRAWINGS

FIG. 14 is a block diagram of a control system for controlling the flow rate of reheat steam in the embodiment shown in FIG. 13.

DESCRIPTION OF THE PREFERRED EMBODIMENTS

Figure 1:
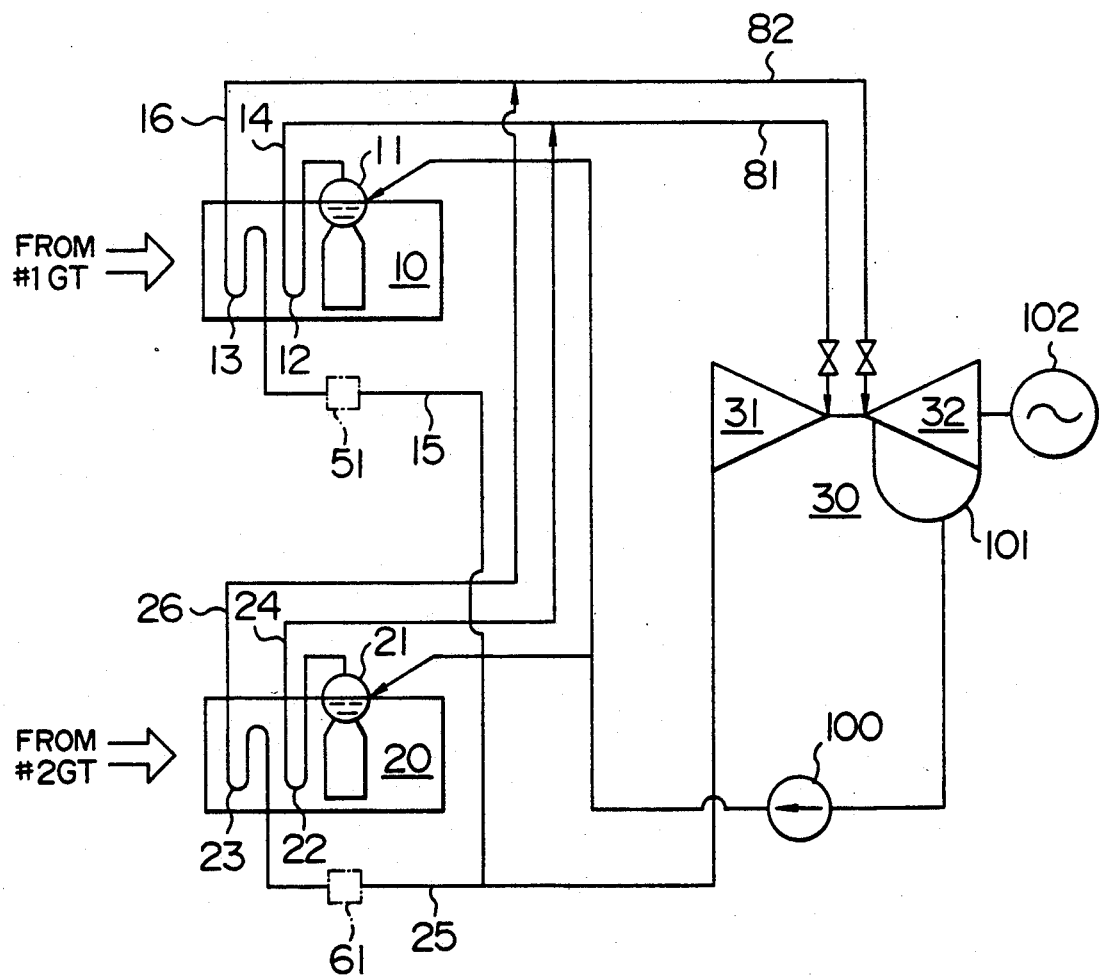
FIG. 1 is a schematic view of an embodiment of the waste heat recovery boiler system in accordance with the present invention.

Preferred embodiments of the present invention will be described with reference to the accompanying drawings. Throughout the drawings, the same reference numerals are used to denote the same or equivalent parts or components.

Various forms of reheating multiple combined plant incorporating gas turbines will be described for the purpose of illustration only.

Referring to FIG. 1, there is shown a reheating multiple combined plant which has a pair of gas turbines #1GT and #2GT (not shown), a pair of waste heat recovery boilers 10 and 20 for recovering heat wasted from the respective gas turbines, and a single steam turbine 30 which is driven commonly by the steam generated by the waste heat recovery boilers 10 and 20.

The waste heat recovery boilers 10 and 20 have, respectively, main steam generators with drums 11 and 21, superheaters 12 and 22 and reheaters 13 and 23. Flows of main steam from the superheaters 12 and 22 are introduced through main steam pipes 14 and 24 which join each other into a common main steam pipe 81 and then led to a high-pressure turbine unit 31 of the steam turbine 30 through the common main steam pipe 81. The steam discharged from the high-pressure steam turbine unit 31 is introduced into the reheaters 13 and 23 of the respective waste heat recovery boilers through cold or low-temperature reheat steam pipes 15 and 25, respectively. Flows of steam reheated by the reheaters 13 and 23 flow into a common hot or high-temperature reheat steam pipe 82 through respective high-temperature reheat steam pipes 16 and 26, and the single flow of the high-temperature reheat steam is introduced into an intermediate-pressure steam turbine unit 32 of the steam turbine 30. Numerals 100, 101 and 102 denote, respectively, a feedwater pump, a condenser and an alternator.

According to the present invention, steam flow rate controllers 51 and 61 are provided at intermediate portions of the low-temperature reheat steam pipes 15 and 25, respectively, for the purpose of controlling the flow rates of the reheat steam through the respective reheaters 13 and 23 in accordance with the levels of the load on the respective waste heat recovery boilers 10 and 20, as will be described later.

Figure 2:
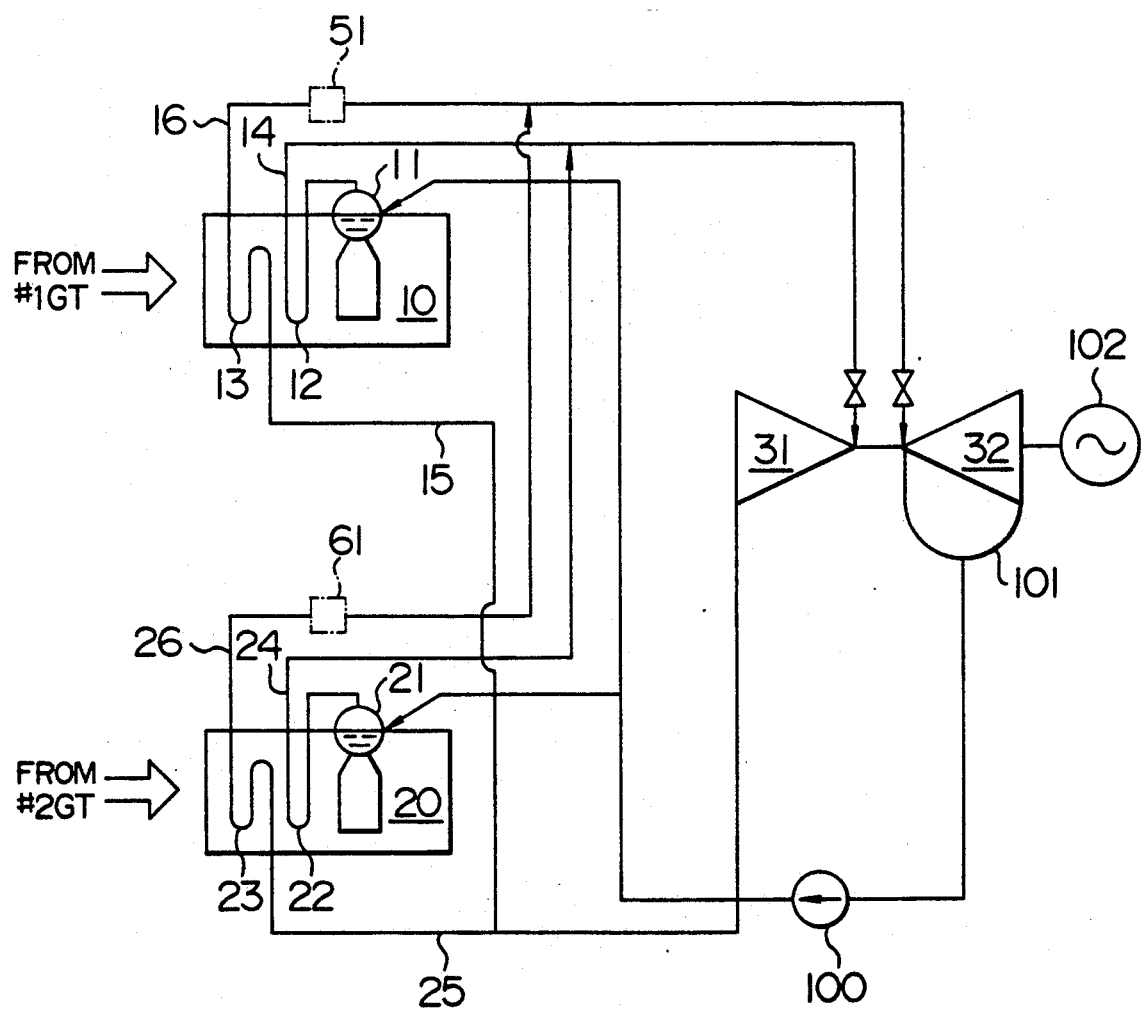
FIG. 2 is a schematic view of another embodiment.

Referring now to FIG. 2 the steam flow rate controllers 51 and 61 are provided at intermediate portions of the high-temperature reheat steam pipes 16 and 26, respectively, unlike the first embodiment in which these controllers are provided in the low-temperature reheat steam pipes 15 and 25.

Figure 3:
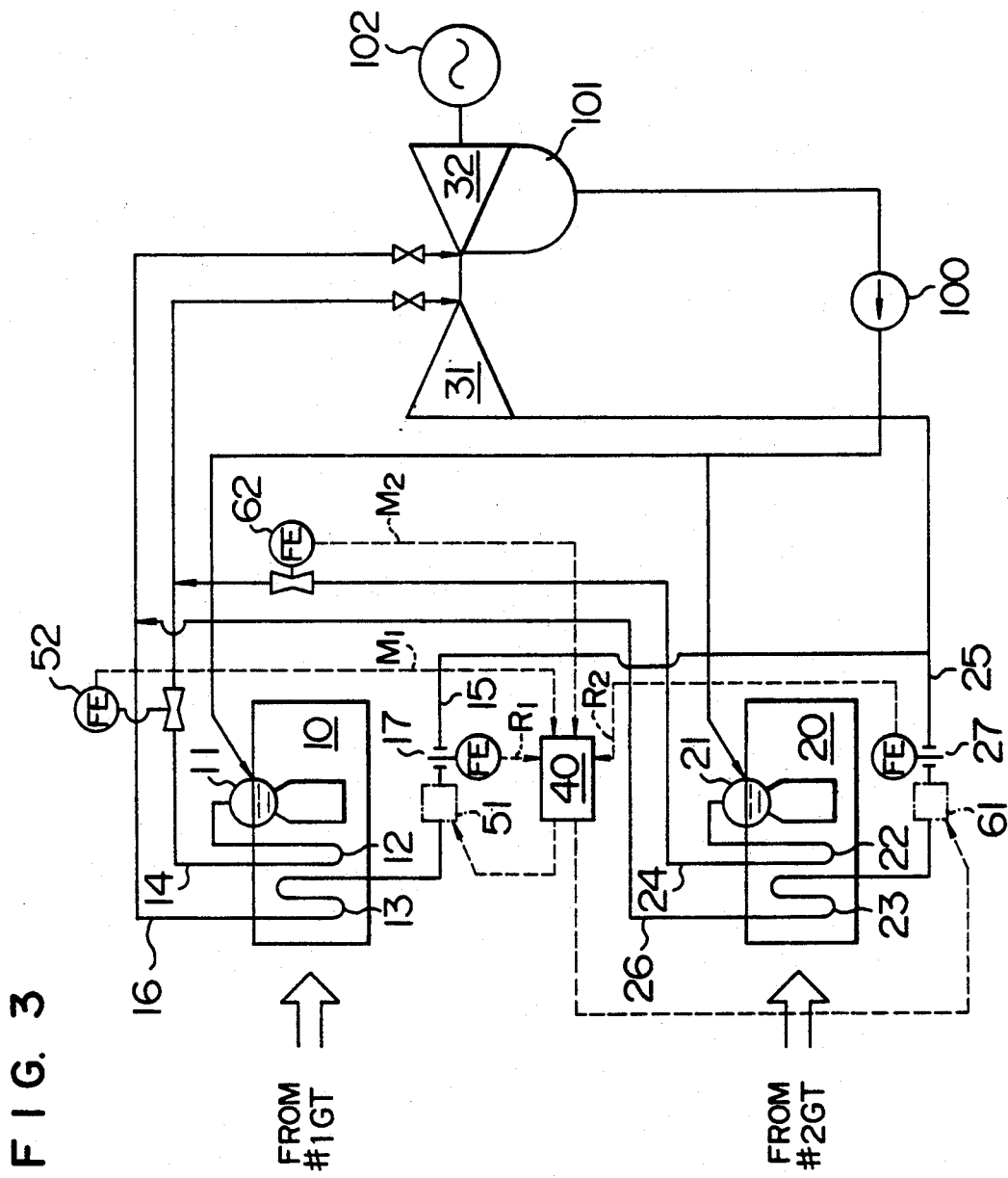
FIG. 3 is a schematic view of a detail of the embodiment shown in FIG. 1.

FIGS. 3 and onwards show practical examples of control means for controlling the steam flow rate controllers 51 and 61. All these control means are applicable equally both to the embodiments of FIGS. 1 and 2, though the following description specifically mentions the embodiment of FIG. 1 for the purpose of illustration.

Referring to FIG. 3, steam flowmeters 17 and 27 capable of measuring the flow rates $R_1$ and $R_2$ of the low-temperature reheat steams flowing into the reheaters of both waste heat recovery boilers 10 and 20 are provided in the low-temperature reheat steam pipes 15 and 25, in addition to the above-mentioned steam flow rate controllers 51 and 61. On the other hand, main steam flowmeters 52 and 62 are provided in intermediate portions of the main steam pipes 14 and 24 for the purpose of measuring the flow rates $M_1$ and $M_2$ of the main steams generated by the respective waste heat recovery boilers 10 and 20.

These flowmeters produce reheat steam flow rate signals ($R_1$, $R_2$) and main steam flow rate signals ($M_1$, $M_2$) indicative of the respective components of the reheat steam and main steam. These signals are delivered to a control unit 40 which is capable of computing the flow rates of the reheat steams into the respective waste heat recovery boilers 10 and 20 and operating the steam flow rate controllers 51 and 61.

Figure 4:
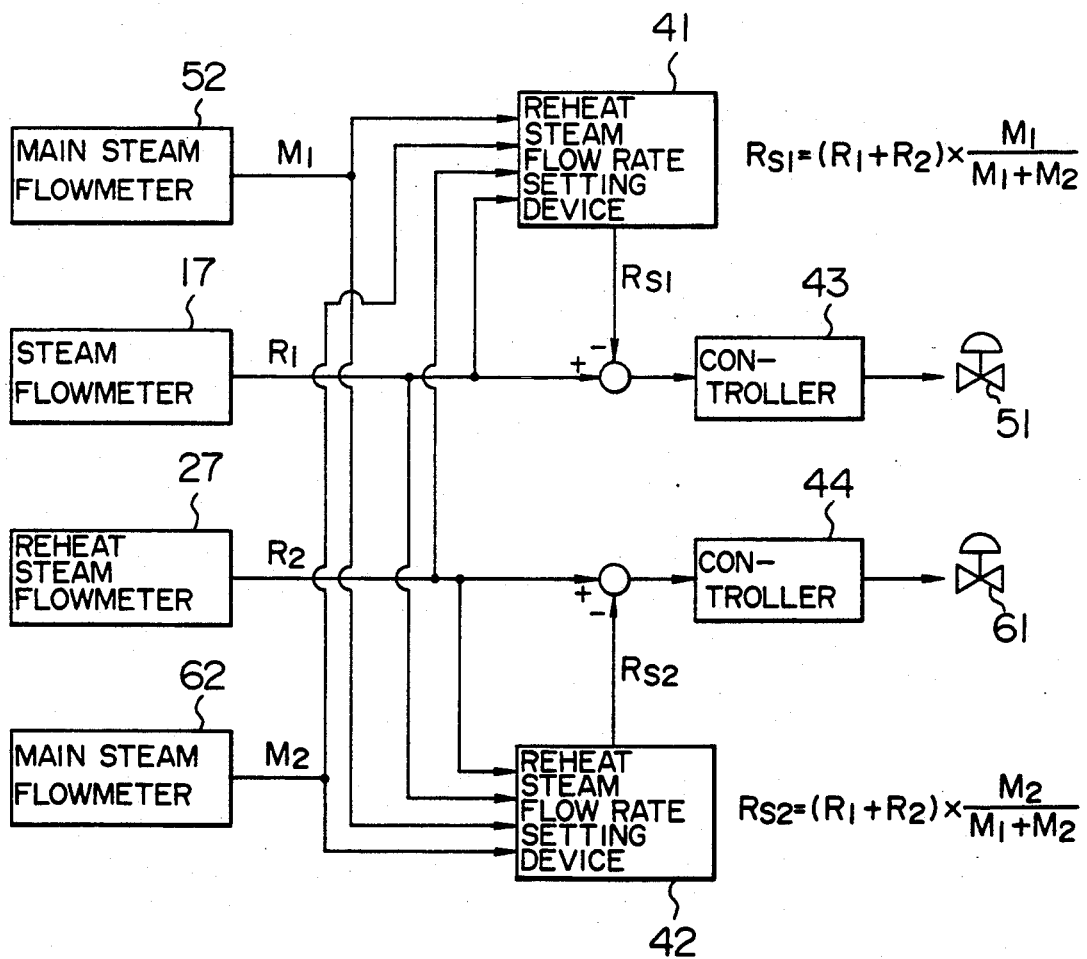
FIG. 4 is a block diagram of a control system for controlling the flow rate of reheat steam in the embodiment shown in FIG. 3.

A practical example of the controlling method will be described with reference to FIG. 4. reheat steam flow rate signals ($R_1$, $R_2$) and main steam flow rate signals ($M_1$, $M_2$), indicative of the respective components of the reheat steam and main steam are delivered to reheat steam, flow rate setting devices 41 and 42 which are capable of computing and setting the optimum flow rates of reheat steams to be supplied to the respective waste heat recovery boilers For example, the flow rate $RS_1$ of the reheat steam to be supplied to the waste heat recovery boiler 10 is determined in proportion to the ratio between the main steam flow rates $M_1$ and $M_2$, in accordance with the following formula:

$$RS_1 = (R_1 + R_2) \times \frac{M_1}{M_1 + M_2}$$

The thus computed set value $RS_1$ of the reheat steam to be supplied to the waste heat recovery boiler 10 is compared with the actually measured flow rate $R_1$. A control device 43 operates the steam flow rate controller 51 such that the actual flow rate $R_1$ coincides with the set value $RS_1$ of the reheat steam. The flow rate of the reheat steam to be supplied to the other waste heat recovery boiler 20 is also controlled in the same manner as that described above.

Namely, the flow rate $RS_2$ of the reheat steam to be supplied to the waste heat recovery boiler 20 is determined in accordance with the following formula:

$$RS_2 = (R_1 + R_2) \times \frac{M_2}{M_1 + M_2}$$

The thus computed set value $RS_2$ of the reheat steam to be supplied to the waste heat recovery boiler 20 is compared with the actually measured flow rate $R_2$. A control device 44 operates the steam flow rate controller 61 such that the actual flow rate $R_2$ coincides with the set value $RS_2$ of the reheat steam.

Thus, in this embodiment, the flow rates of the main steam generated by the respective waste heat recovery boilers 10 and 20 are used as indices of the levels of the load on the respective waste heat recovery boilers 10 and 20, and the flow rates of the reheat steam through the reheaters 13 and 23 of the respective waste heat recovery boilers 10 and 20 are controlled such that the ratio between the flow rates of the reheat steam equals to the ratio between the flow rates of the main steam, whereby a stable operation of the plant is ensured.

Figure 5:
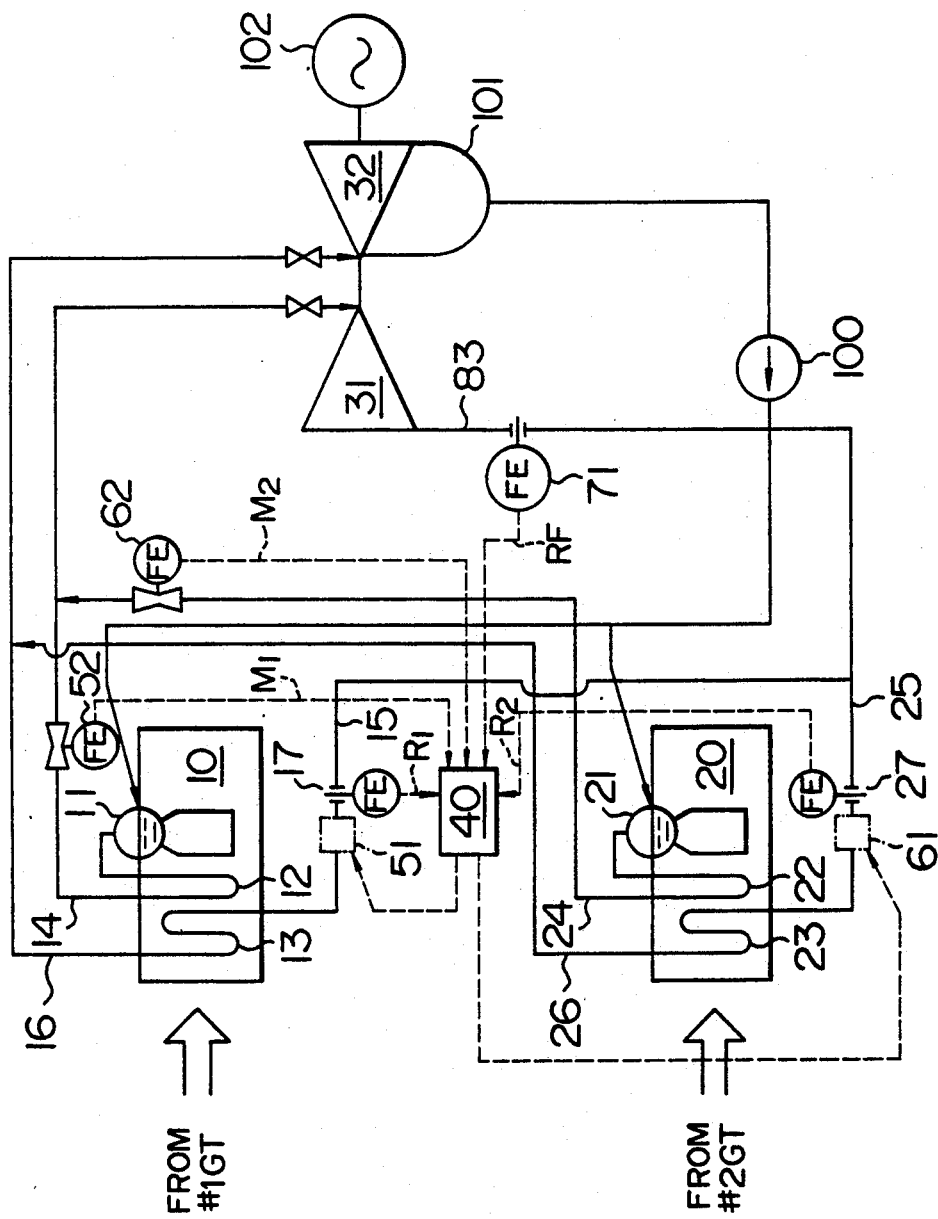
FIG. 5 is a schematic view of still another embodiment of the present invention.
Figure 6:
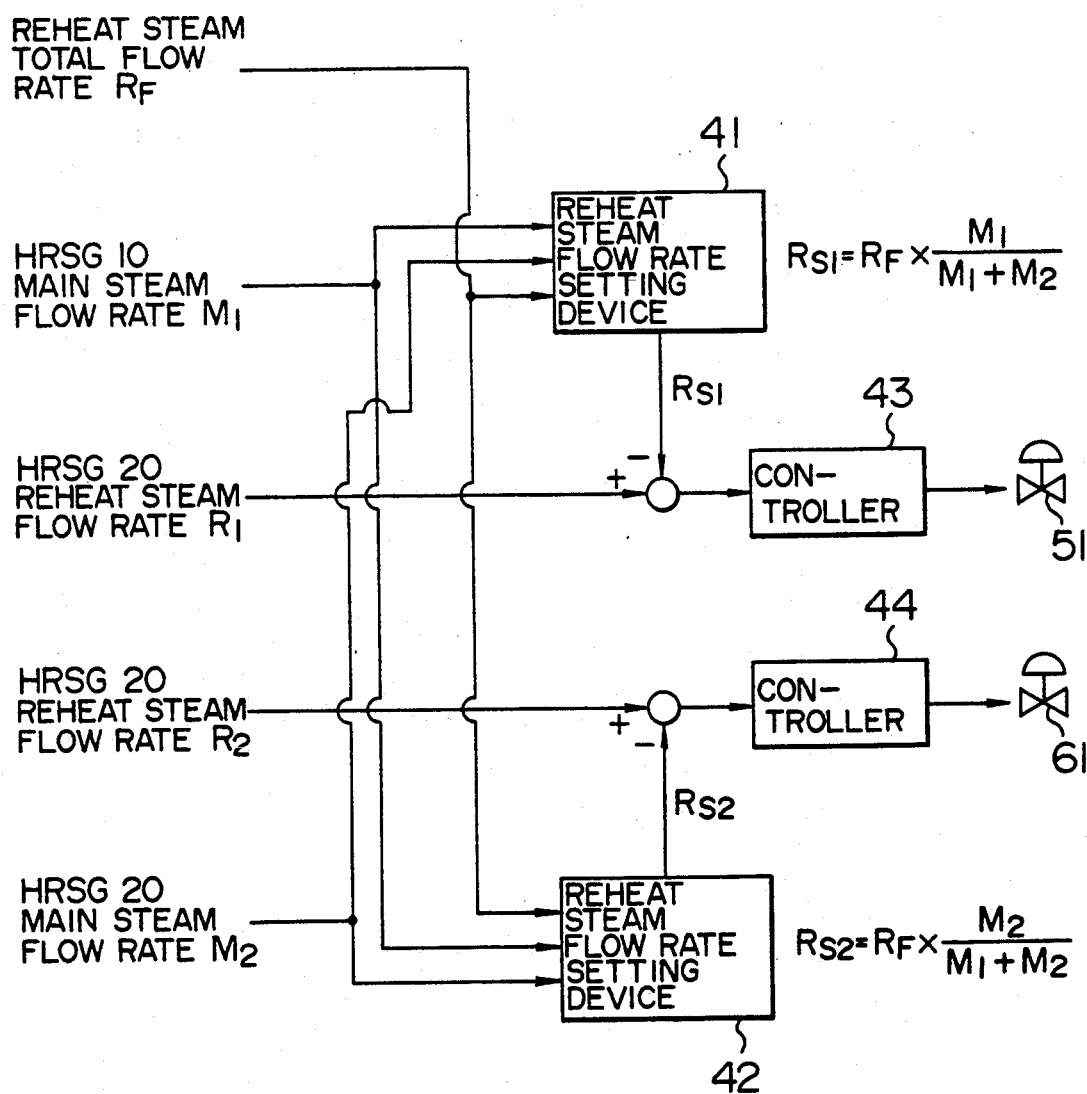
FIG. 6 is a block diagram of a control system for controlling the flow rate of reheat steam in the embodiment shown in FIG. 5.

In FIG. 5 in the flow rates of the reheat steam to be supplied to the reheaters 13 and 23 of the respective waste heat recovery boilers 10 and 20 are determined on the basis of the total flow rate $R_F$ of the reheat steam which is measured by a steam flowmeter 71 which is provided in a common portion 83 of the low-temperature reheat steam pipes. This is contrasted to the embodiment of FIG. 3 in which the flow rates of reheat steam to respective reheaters 13 and 23 are determined on the basis of the total reheat steam flow rates ($R_1+R_2$) which are calculated from the actually measured values $R_1$ and $R_2$ of the reheat steam. The control of the flow rates of the reheat steam in this embodiment is conducted in a manner shown in FIG. 6.

Figure 7:
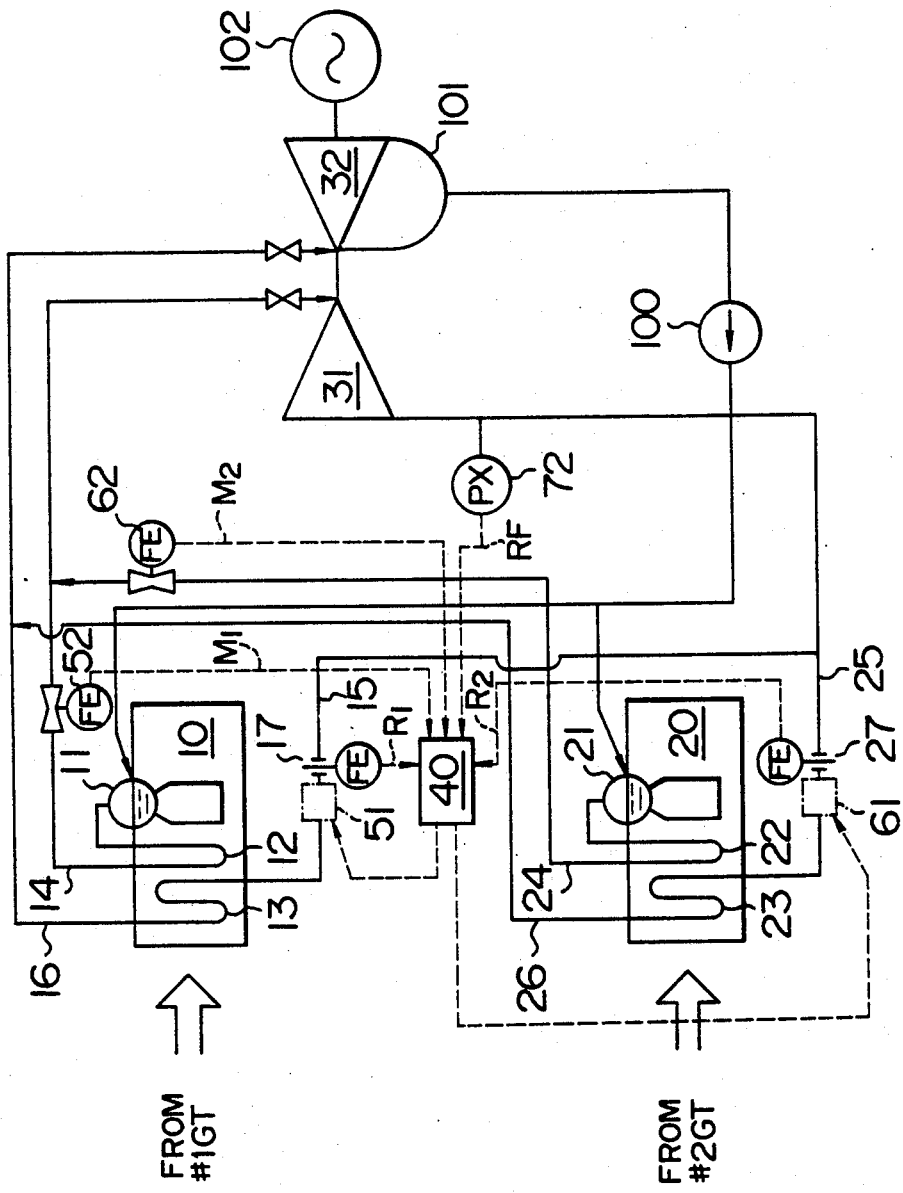
FIGS. 7 and 8 are schematic views showing different embodiments of the present invention.
Figure 8:
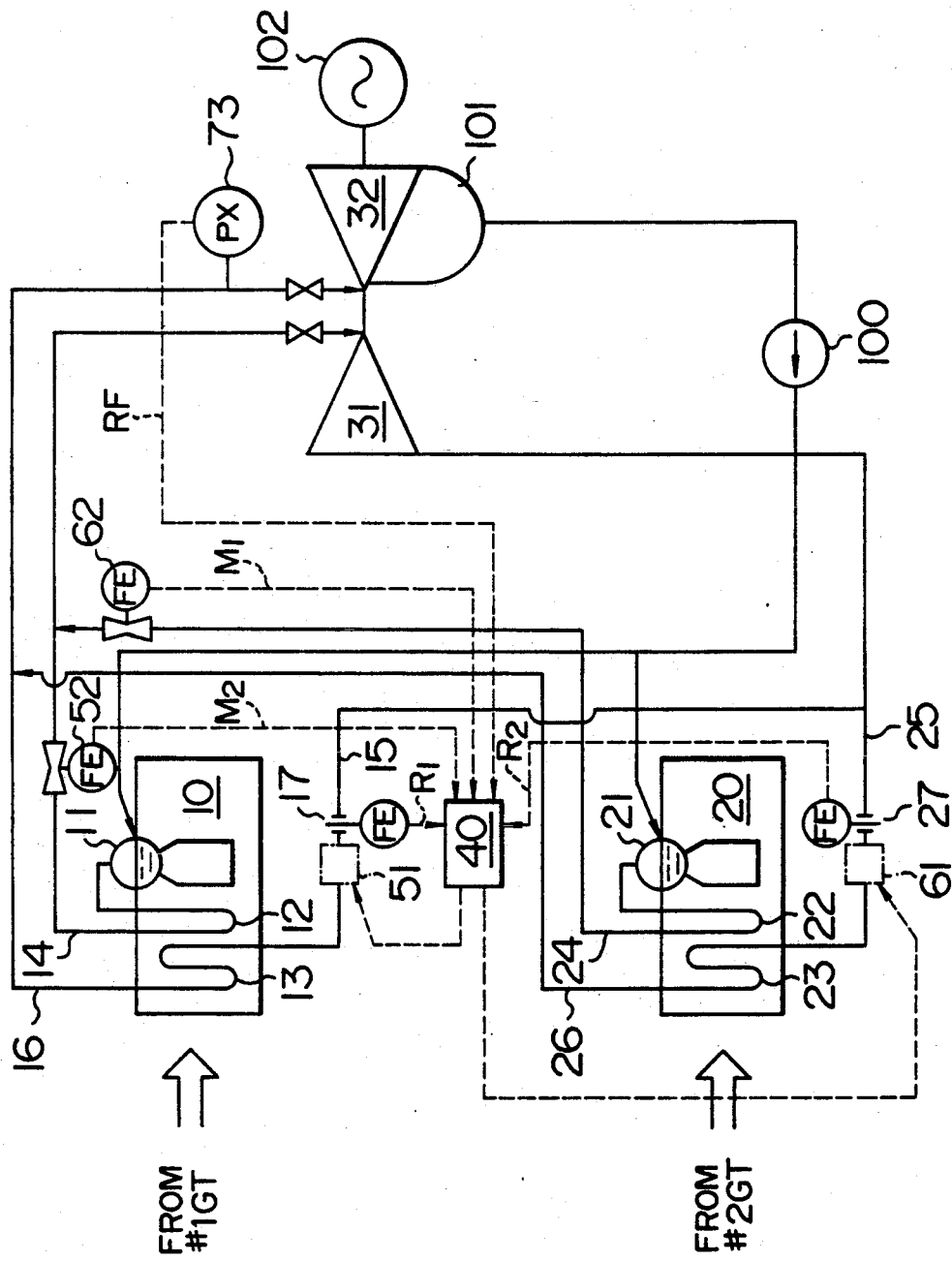
Figure 9:
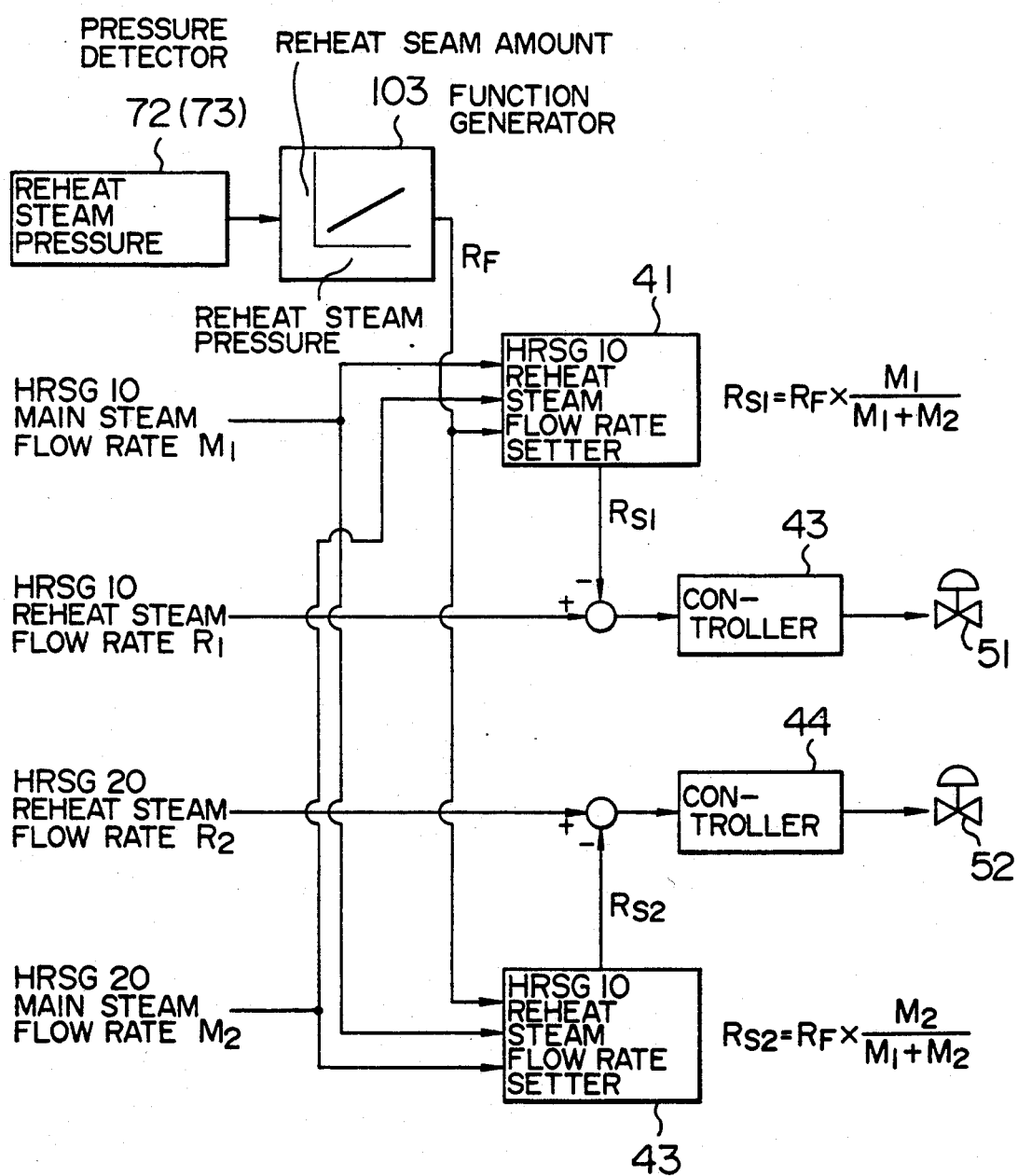
FIG. 9 is a block diagram of a control system for controlling the flow rate of reheat steam in the embodiments shown in FIGS. 7 and 8.

Unlike the embodiment of FIG. 5 in which the total flow rate $R_F$ of the reheat steams is measured by means of the steam flowmeter 71 provided in a common portion 83 of the low-temperature reheat steam pipes, the embodiment of FIG. 7 measures the pressure of the low-temperature reheat steam by means of a pressure detector 72. Similarly, the embodiment of FIG. 8 measures the pressure of the high-pressure reheat steam by means of a pressure detector 73. As shown in FIG. 9, the total flow rate $R_F$ of the reheat steams is predicted as an output from a function generator 103 which is capable of generating, upon receipt of the steam pressure signal, a signal representative of the steam flow rate corresponding to the input steam pressure signal. Then, the flow rates of the reheat steam to be supplied to the reheaters 13 and 23 of the respective waste heat recovery boilers 10 and 20 are controlled in accordance with the thus predicted total flow rate $R_F$ of the reheat steam.

Figure 10:
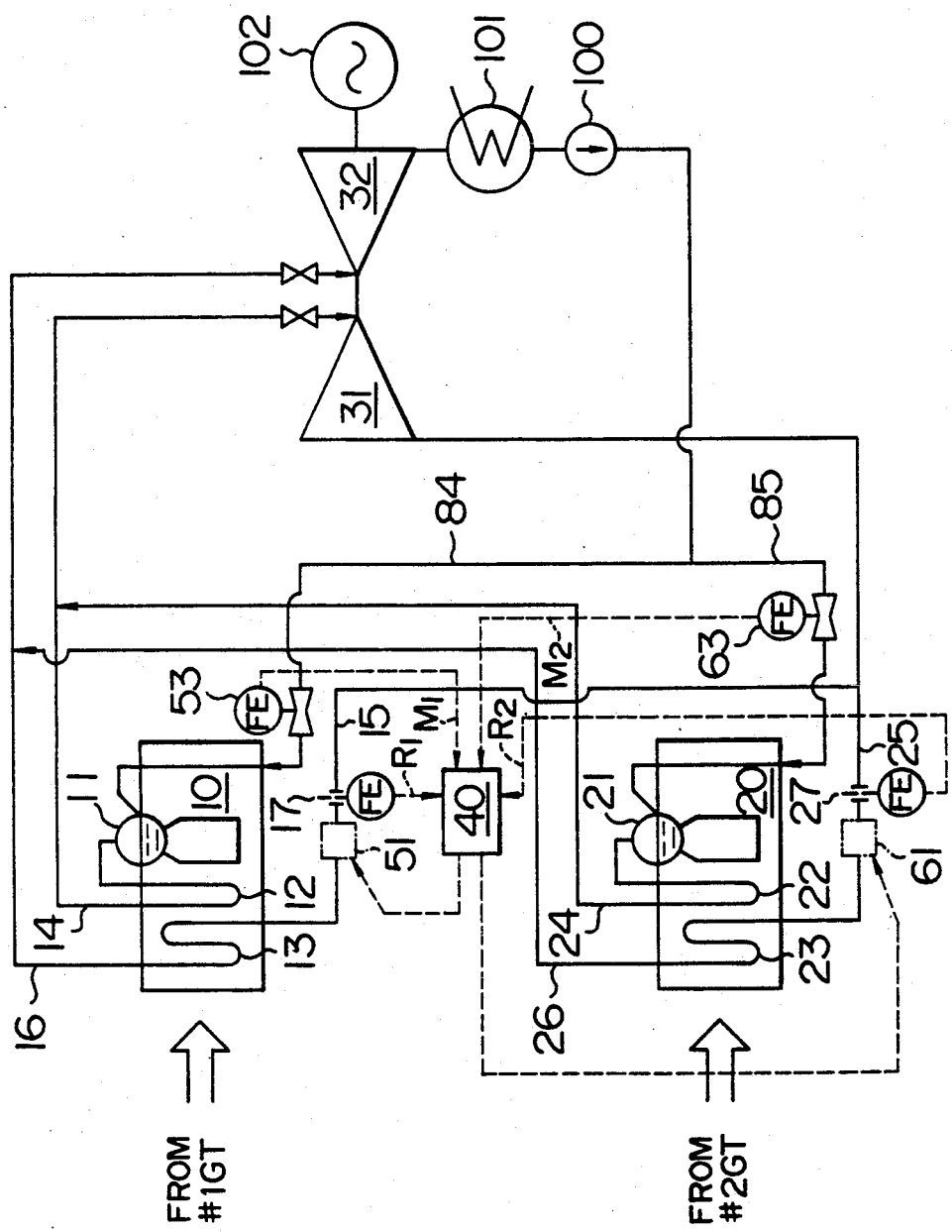
FIGS. 10 to 13 are schematic views of different embodiments of the present invention.

In FIG. 10 the rates of supply of feedwater to the respective waste heat recovery boilers 10 and 20 as indices of the levels of the load applied to the waste heat recovery boilers 10 and 20, in contrast to the foregoing embodiments in which the flow rates $M_1$ and $M_2$ of the main steam from the respective boilers 10 and 20 are used as the indices.

More specifically, in the embodiment of FIG. 10, the rates of supply of feedwater to the drums 11 and 21 of the respective waste heat recovery boilers 10 and 20 are measured by feedwater flowmeters 53 and 63 provided in the feedwater pipes 84 and 85 and the signals representative of the measured flow rates of the feedwater are supplied to the control unit 40. In general, water flowmeter exhibits a higher accuracy than steam flowmeters, so that the embodiment shown in FIG. 10 can offer a more appropriate determination of the reheat steam flow rates than other embodiments which rely upon steam flow meters.

Figure 11:
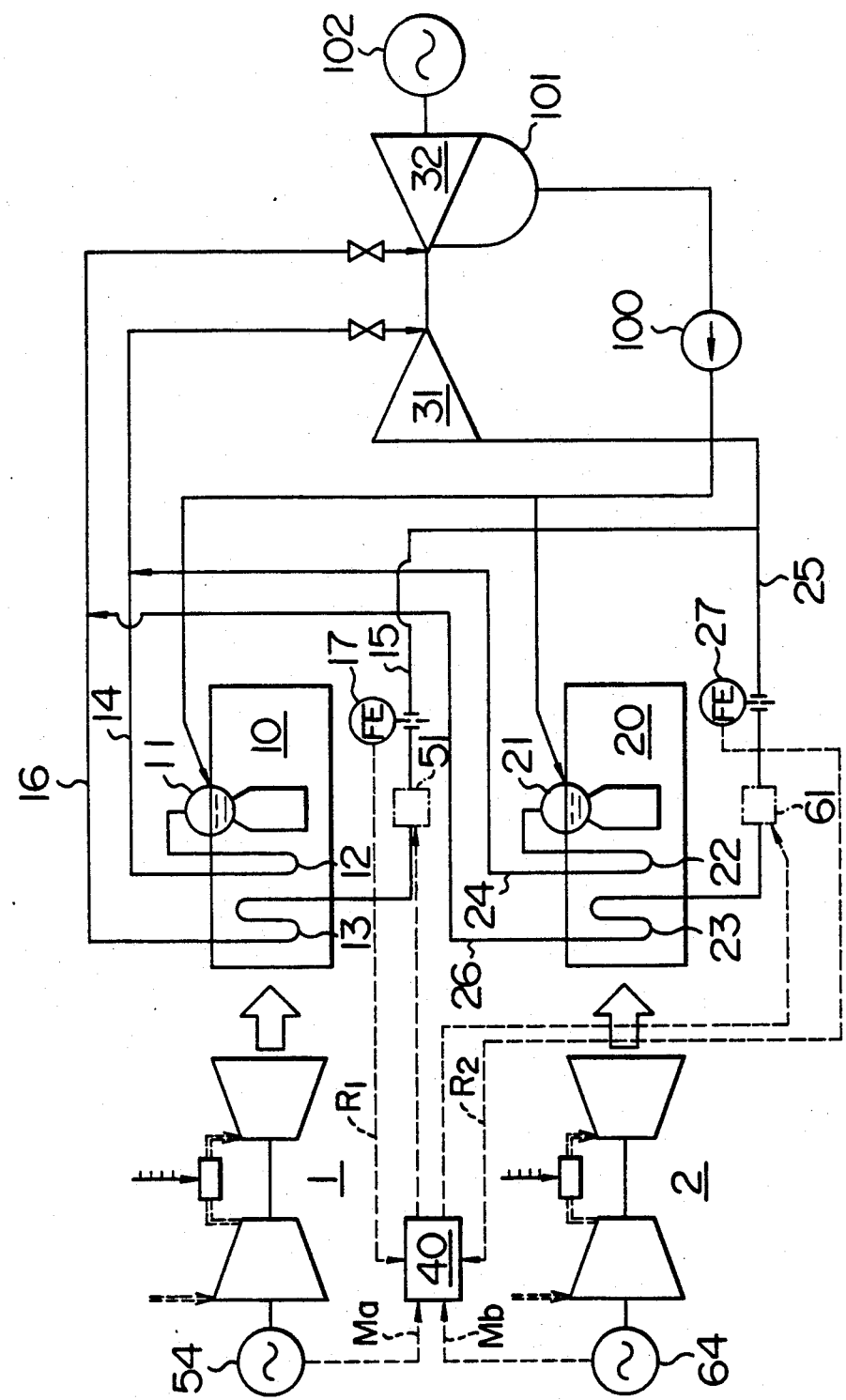

In FIG. 11, the flow rates of the reheat steam to be supplied to the respective waste heat recovery boilers 10 and 20 are determined on the basis of the loads applied to the gas turbines 1 and 2 which are the sources of the waste heat, in contrast to the foregoing embodiments which employ the levels of the load on the waste heat recovery boilers 10 and 20. Thus, in the embodiment shown in FIG. 11, the output signals from alternators 54 and 64 driven by the gas turbines 1 and 2 are delivered as values Ma and Mb which represent the levels of the load applied to the gas turbines 1 and 2, and these signals Ma and Mb are delivered to the control unit 40. This embodiment can provide substantially the same advantage as those provided by the foregoing embodiments, provided that the waste heat is derived from the gas turbines alone.

Figure 12:
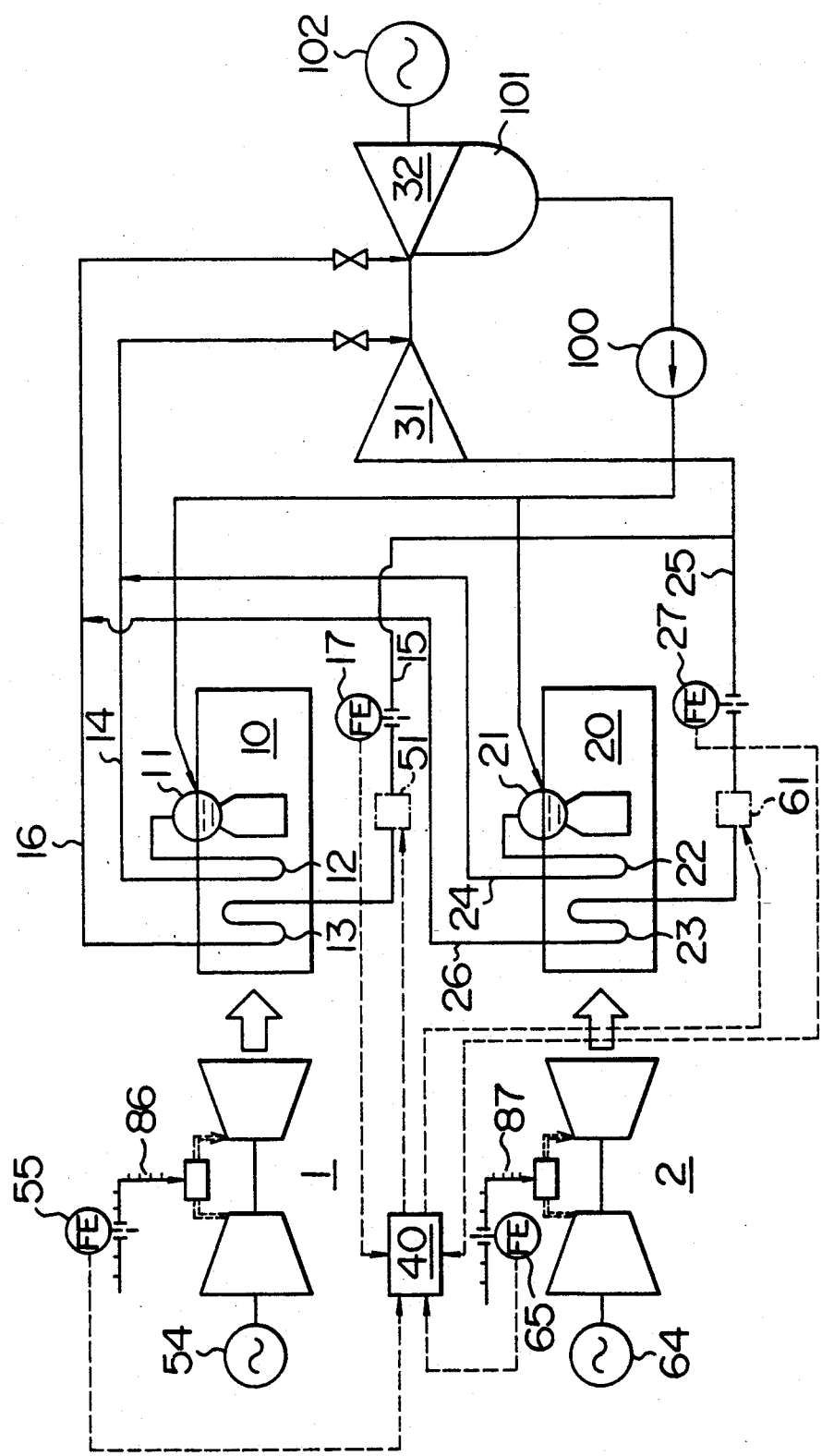

In the modification of FIG. 12, the rates of supply of fuel to the gas turbines 1 and 2 are used in place of the output signals Ma and Mb used in the embodiment shown in FIG. 11. Thus, fuel flow rate signals produced by fuel flowmeters 55 and 56 provided in fuel lines 86 and 87 leading to the gas turbines 1 and 2 are delivered to the control unit 40.

Figure 13:
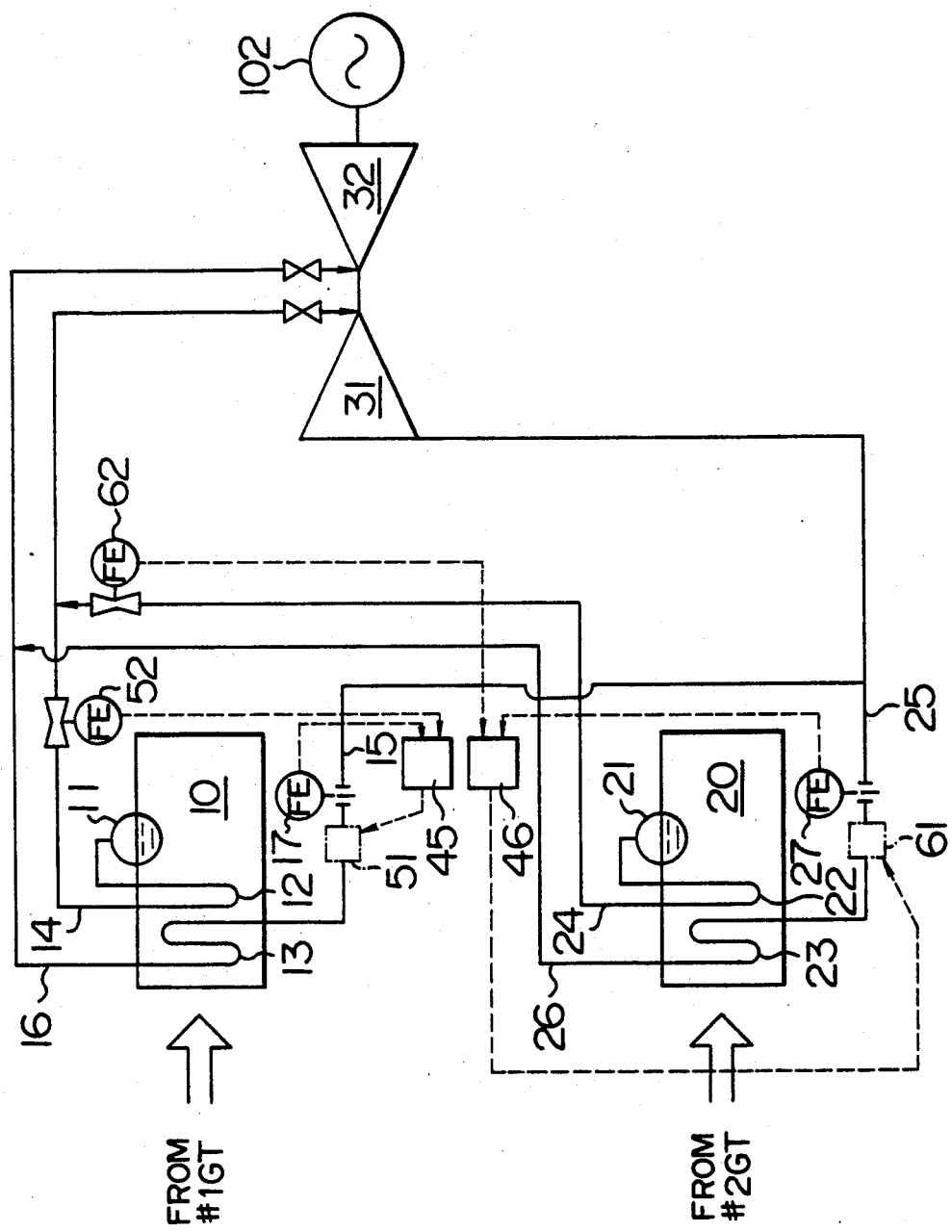

In the embodiments described hereinbefore, the flow rates of the reheat steam to be supplied to the reheaters of the respective waste heat recovery boilers are determined by the control unit 40 which receives signals indicative of the measured values of flow rates of the reheat steams and the levels of the loads on the respective waste heat recovery boilers or gas turbines. In contrast, a still further embodiment shown in FIG. 13 is capable of operating the steam flow rate controllers 51 and 61 such that the flow rates of the reheat steam flowing through the reheaters 13 and 23 of the respective waste heat recovery boilers 10 and 20 are substantially equalized to the flow rates of the main steam of the respective waste heat recovery boilers. The control is practically carried out in a manner shown in FIG. 14. It will be seen that the embodiment shown in FIG. 13 offers substantially the same effect as those produced by other embodiments.

It is to be noted, however, that the embodiment shown in FIGS. 13 and 14 is based on an assumption that suitable control systems (not shown) are used to maintain a constant water level or to keep the water level within a predetermined range in the drums 11 and 21 of the respective waste heat recovery boilers 10 and 20, so that the flow rates of the main steam from the respective waste heat recovery boilers 10 and 20 well represent the levels of the loads applied to these boilers. Flow rate detectors 52 and 62 measure the flow rates of the main steams from the respective waste heat recovery boilers 10 and 20 and produce signals indicative of these flow rates. These signals are supplied to arithmetic units 107 and 108 which are capable of producing command values of the flow rates of the reheat steam to be supplied to the reheaters 13 and 23 of the respective waste heat recovery boilers 10 and 20. Then, the control devices 45 and 46 control the steam flow rate controllers 51 and 61 so that the flow rates of the reheat steam through the waste heat recovery boilers are controlled substantially in conformity with the levels on the respective waste heat recovery boilers 10 and 20.

Although the invention has been described with reference to a reheating multiple combined plant having two gas turbines, two waste heat recovery boilers coupled to the gas turbines, and a single steam turbine, this is not exclusive and the invention can be applied to plants having three or more gas turbines and boilers.

The waste heat for the waste heat recovery boiler system of the present invention may be derived from various type of waste heat sources such as gas turbines, blast furnaces of iron works, and so forth. Various systems can utilize the steam produced by the waste gas recovery boiler system of the invention. For example, the steam may be used for driving an electrical power generating steam turbine or for various other industrial purposes. The waste heat recovery boiler system of the present invention can also be used as a system which produce and supply both heat and electric power.

In the described embodiments, the flow rates of the reheat steam to be supplied to the reheaters of the respective waste heat recovery boilers are controlled by independent flow rate controllers provided in respective reheat steam lines. This, however, is only illustrative and a simpler system can be realized within the scope of the invention by using only one controller which is associated with one of the waste heat recovery boilers so as to control the flow rates of the reheat steams to be supplied to both waste heat recovery boilers.

What is claimed is:

1. A reheating multiple combined plant comprising a plurality of gas turbines, a plurality of waste heat recovery boilers associated with the respective gas turbines, said waste heat recovery boilers each having a main steam generator and a reheater capable of generating main steam and reheat steam by the heat derived from the waste gas from the associated gas turbine, said main steam generator being disposed downstream of said reheater as viewed in the direction of a flow of said waste gas through each boiler, a steam turbine having at least one high-pressure turbine and at least one low-pressure turbine, a main steam pipe through which a single flow of the main steam formed by flows of the main streams from said main steam generators is introduced to said high pressure turbine of said steam turbine, a high-temperature reheat steam common pipe into which the flows of reheat steams from said reheaters of said waste heat recovery boilers are introduced through respective high-temperature reheat steam branch pipes extending from said reheaters, said high-temperature reheat steams being supplied through said high-temperature reheat steam common pipe into said low-pressure turbine of said steam turbine, a low-temperature reheat steam common pipe through which steam from said high-pressure steam turbine is distributed to low-temperature reheat steam branch pipes leading to said reheaters, and at least one flow rate control means provided in at least one of the branch pipes connected to at least one of said reheaters.

2. A reheating multiple combined plant comprising a plurality of waste heat recovery boilers each having a main steam generator and a reheater capable of generating main steam and reheat stem by the heat derived from a hot waste gas, said main steam generator being disposed downstream of said reheater as viewed in a direction of flow of said hot waste gas through each boiler, a steam turbine having at least one high-pressure turbine and at least one low-pressure turbine, a main steam pipe through which the single flow of the main steam formed by flows of the main steams from said main steam generators is introduced into said high-pressure turbine of said steam turbine, a high-temperature reheat steam common pipe into which the flows of reheat steams from said reheaters of said waste heat recovery boilers are introduced through respective high-temperature reheat steam branch pipes leading from said reheaters, said high-temperature reheat steam being supplied through said high-temperature reheat steam common pipe into said low-pressure turbine of said steam turbine, a low-temperature reheat steam common pipe through which steam from said high pressure steam turbine is distributed to low-temperature reheat steam branch pipes leading to said reheaters, and at least one flow rate control means provided in at least one of the branch pipes connected to at least one of said reheaters.

3. A waste heat recovery boiler system comprising:
a plurality of waste heat recovery boilers each having a main steam generator and a reheater capable of generating main steam and reheat steam by heat derived from a hot waste gas, said main steam generator being disposed downstream of said reheater as viewed in a direction of the flow of said hot waste gas through each boiler;
a main steam common pipe into which the flows of main steams generated by said main steam generators are introduced;

a high-temperature reheat steam common pipe into which flows of the reheat steams from the reheaters are introduced through respective high-temperature reheat stream branch pipes so that the flows of said reheat steams form a single flow of reheat steams which is served through said high-temperature reheat steam common pipe;

a low temperature reheat steam common pipe from which a low-temperature reheat steam is supplied to the reheaters through respective low-temperature reheat steam branch pipes; and at least one steam flow controller provided in at least one of the branch pipes connected to one of said high-temperature reheat steam common pipe or said low-temperature reheat steam common pipe and capable of controlling the flow rate of the steam flowing through the reheater connected to said branch pipe having said steam flow controller.

4. A waste heat recovery boiler system comprising:
a first waste heat recovery boiler including a first steam generator and a first reheater both disposed in a flow of a hot waste gas with said first reheater arranged upstream of said first steam generator;

pipeline means for respectively introducing into an operating machine a steam generated by said first steam generator and another steam reheated by said first reheater;

a second waste heat recovery boiler including a second steam generator and a second reheater through which a further steam flows at a controlled flow rate and which is operative to generate a further steam substantially equal in condition to the reheated steam flowing out of said first reheater;

said second steam generator and said second reheater both being disposed in another flow of a hot waste gas with said second reheater arranged upstream of said second steam generator;

means for causing the steam reheated by said second reheater to join with the reheated steam from said first reheater so that the reheated steam from said second reheater is introduced into said operating machine; and another pipeline means for introducing a steam generated by said second steam generator into said operating machine.

5. A waste heat recovery boiler system comprising:
a first heat source discharging a first high-temperature waste gas;

pipeline means for respectively introducing into an operating machine a steam generated by a steam generator of a first waste heat recovery boiler and another steam reheated by a reheater of the first waste heat recovery boiler;

a second heat source discharging a second high-temperature waste gas;

a second waste heat recovery boiler including another steam generator and another reheater both disposed in a flow of said second high-temperature waste gas with said another reheater arranged upstream of said another steam generator;

said another reheater being operative to generate a further steam substantially equal in condition to the reheated steam flowing out of the reheater of said first waste heat recovery boiler;

means for controlling the rate of supply of the further steam to said another reheater based upon one of a load of said second heat source and a process amount determined by said load;

means for causing said further steam thus reheated by said another reheater to join with the reheated steam from the reheater of said first waste heat recovery boiler so that the reheated steam from said another reheater is introduced into said operating machine; and another pipeline means for introducing a steam generated by said another steam generator into said operating machine.

* * * * *